F. R. TODD.
MANURE SPREADER.
APPLICATION FILED FEB. 1, 1912.
1,128,734.
Patented Feb. 16, 1915.
2 SHEETS—SHEET 2.
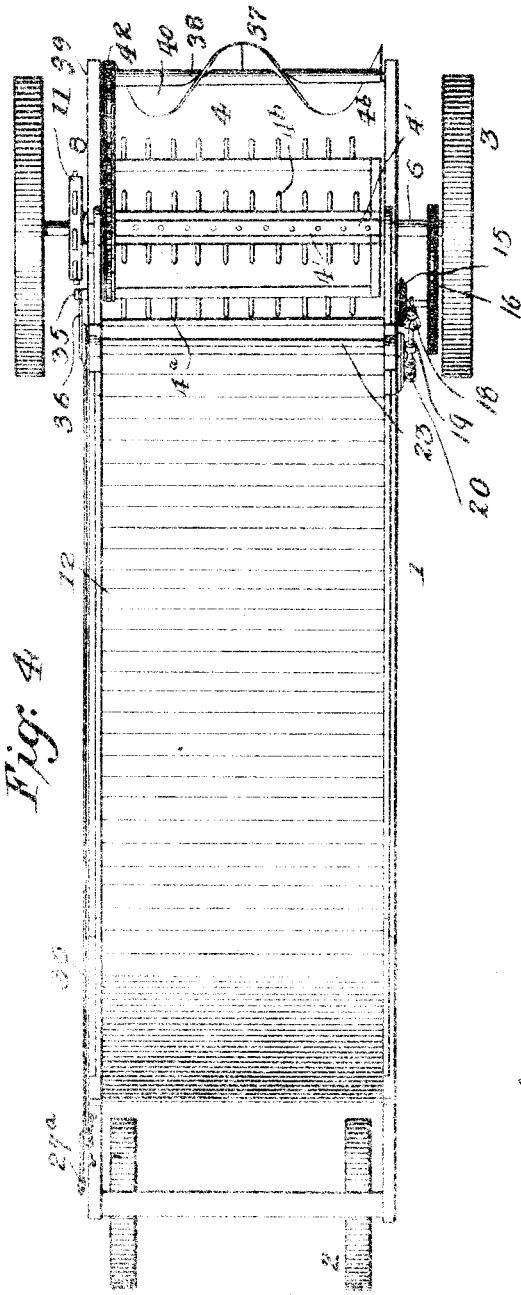
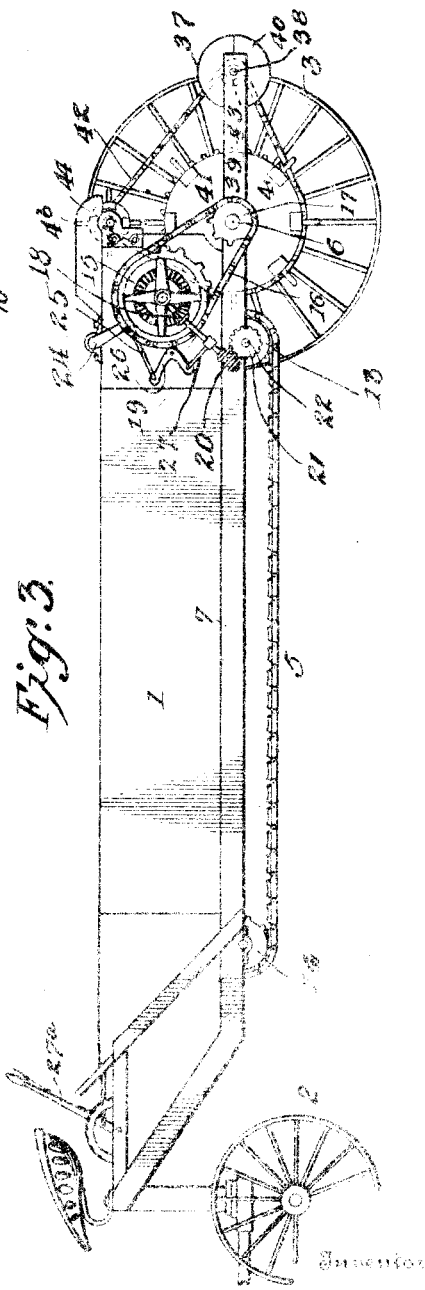

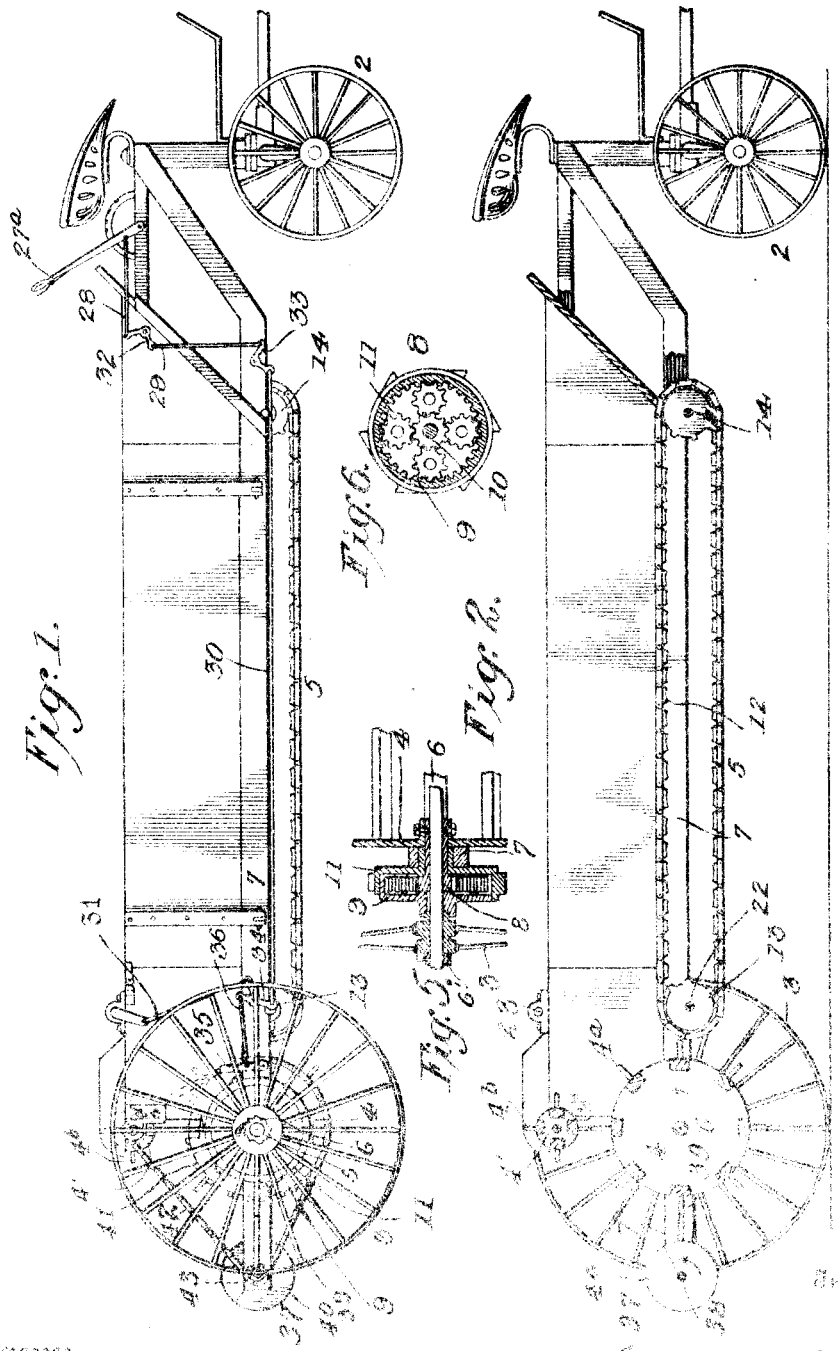

UNITED STATES PATENT OFFICE.

FLOYD R. TODD, OF MOLINE, ILLINOIS, ASSIGNOR TO MARSEILLES COMPANY, OF EAST MOLINE, ILLINOIS, A CORPORATION OF ILLINOIS.

MANURE-SPREADER.

1,128,734.

Specification of Letters Patent.

Patented Feb. 16, 1915.

Application filed February 1, 1912. Serial No. 674,688.

*To all whom it may concern:*

Be it known that I, FLOYD R. TODD, a citizen of the United States, residing at Moline, in the county of Rock Island and State of Illinois, have invented certain new and useful Improvements in Manure-Spreaders, of which the following is a specification, reference being had therein to the accompanying drawing.

This invention relates to fertilizer distributers and in particular to that class containing those in which each machine comprises a body structure having a movable bottom and devices at the rear of the bottom for spreading or distributing the material upon the ground.

Of the drawings Figure 1 is a side view of a mechanism embodying my improvements. Fig. 2 is a longitudinal vertical section. Fig. 3 is a side elevation showing the side of the machine opposite to that shown in Fig. 1. Fig. 4 is a plan view of the machine. Fig. 5 is a partial vertical transverse sectional view through the rear axle showing the beater driving mechanism. Fig. 6 is a vertical longitudinal sectional view through the beater driving mechanism.

In the drawings the machine is illustrated as being a vehicle, when considered as an entirety, it having the body part 1, the front wheels 2, and the rear wheels 3. In many respects these parts can be constructed in any of the many now well known ways. The front wheels form part of the truck structure, under the front end of the body, and capable of turning in whichever direction it is desired that the vehicle as a whole should move. The rear wheels 3 are adapted to not only serve as rolling supports for the rear part of the vehicle body, but also as motors for driving the beater 4, and for actuating the supporting and feeding devices 5, the latter being the mechanism by which the manure is slowly carried backward in the vehicle to the beater. The rear wheels 3 are mounted upon the axle 6, and cause the axle to rotate with them by transmitting motion through ratchet devices indicated by 6'. These ratchet connections between the wheels and the rear axle are advantageous in permitting one wheel to travel faster than the other when the vehicle is turning corners. Upon this axle the vehicle body is supported by means of sills or carriers 7. Upon it is supported also the beater 4, which is provided with fingers for shredding the load. The beater is mounted loosely on the axle so that it can turn at a different speed, and in an opposite direction. The beater is thus much more firmly supported than when it is held by a shaft or supports that are attached to the side boards of the body, independently of the axle. These rotary beaters, in mechanisms of this class, revolve with a high speed, and, when at work, are subjected to severe stresses and strains. When mounted in the way which I have provided, the body part is relieved of these strains, and the ground wheels have imparted to them directly the severe work which the beater mountings must necessarily perform. While the axle is rotating relatively slowly in one direction, it transmits to the beater through the gearing 8, which is concentric therewith, a high rotary speed in the opposite direction. Gearing capable of this sort of work is now well known and a set of driving parts for this purpose can be readily selected by the builder. A gearing of this sort is shown at 8, this comprising a driving element 9, a driven element 10, and an intermediate controlling element 11, the whole of the mechanism indicated being one such as is shown in Reissue Patent 13,318, November 21, 1911, to Theophilus Brown.

The feeder 5, the mechanism for conveying the material backward to the beater 4, consists mainly of the slatted bottom 12, the slats of which are connected together in any suitable or well known way. As shown, the bottom structure is of the endless class adapted to move continuously in one direction, the upper part thereof carrying the contents of the vehicle to the beater and then returning around the roller 13 to the roller 14 at the front end of the structure. The power for moving the slatted bottom may be transmitted to either of its rollers in any usual or preferred manner. As shown, I have indicated a bevel wheel at 15 driven by a chain 16 and a sprocket pinion 17 on the rear axle 6, the wheel 15, in turn, driving the bevel pinion 18 which is on a countershaft 19 carrying a worm 20. The latter engages with the worm wheel 21 on the shaft 22 of the rear apron roller 13. The driving mechanism for the apron roller can be disengaged therefrom by any of the usual devices. Thus the countershaft 19 may be so arranged as to vibrate around the axis of its driving wheel 15, the upward swinging thereof being effected by a rock shaft 23, crank arm 24, link 25, bell lever 26 and link 27, the latter being connected by a sleeve or otherwise to the countershaft. The rock shaft 23 can be actuated by the driver of the vehicle through the hand lever 27<sup>a</sup> which is connected to it through the links 28, 29, 30 and 31 and the bell levers 32, 33 and 34. This manual mechanism for throwing the feeder apron out of and into action can also be connected to the devices which control the transmission of power to the beater from the ground wheels.

As shown and described in the patent above referred to, the controlling ring or element 11 of the power transmitter is permitted to move, or is arrested, by means of a stop dog 35 pivoted to a stationary part of the vehicle. 36 is a link connecting the bell lever 34 with this stop dog. When the driver moves the lever 27<sup>a</sup> forward it, through the links 28, 29, 30 and 36, thrusts the stop dog 35 into the path of the projections on the controller element 11, stopping the latter against rotation, and at the same time, through the link 31, the rock shaft 23, and the links 25 and 27, lowering the worm into engagement with the worm wheel on the apron roller, causing the feeder apron to commence its delivery movement immediately after the feeder starts its rotating.

Directly above the main beater 4, I place a small cylinder or auxiliary beater 4'. This cylinder has projecting fingers 4<sup>b</sup> similar to those on the beater 4.

Directly at the rear of the beater 4 I have mounted a laterally acting distributing device indicated by the numeral 37. This comprises a transverse shaft 38 mounted in rearward extensions 39 of the sills 7. A spiral or screw-like blade 40 surrounds the shaft 38. This blade is formed of a single strip wound outwardly from the center of the shaft in oppositely directed spirals. The pitch of the spiral is so made that it will, on being rotated in the direction opposite to that of the ground wheels, cause particles of the manure thrown upon it by the beaters to be spread out laterally in a swath considerably wider than the path of the machine.

In order to actuate the lateral spreading device and the auxiliary beater, I drive a chain 42 by sprocket teeth 41 carried by one head of the beater, this chain extending around small sprockets 43 and 44 fixed on the ends of the spiral distributer shaft and the auxiliary beater shaft, respectively. Since the beater rotates in a direction opposite to that in which the ground wheels rotate, it is evident that the auxiliary beater and the distributing device will likewise be caused to rotate in that direction.

By mounting the beater directly upon the axle, I provide a machine in which beater driving chains are eliminated and the entire work of rotating this heavy part of the mechanism at a high rate of speed is carried by a compact and strong gearing. A single chain is used to operate the toothed cylinder and the lateral spreading device. In other machines which employ auxiliary beaters or toothed cylinders and lateral distributing devices, it has been found necessary to employ a multiplicity of chains which furnish a troublesome item of upkeep.

My experience with mechanisms of this class in which the rotary beater is mounted at the axis of the rear driving wheels, has led me to observe several disadvantages when the apron of a slatted conveyer bottom is arranged entirely below, or entirely above (practically) the beater. In most cases the bottom support for the material has been arranged below the beater, and the latter has been expected to engage with the material at all lines of that half of the periphery of the revolution which lies forward of the vertical plane passing through the axis. The fingers of the beater which lie below the horizontal plane passing through the axis, move relatively forward, that is, toward the front end of the machine, and therefore move toward or against the advancing mass of material. The work done by them during this quarter of the revolution is work which is not only idle, but is destructive of power and detracts from the efficiency of the machine. I have found that by arranging the bottom of the conveyer in a way such as I have shown, superior results are obtained. It will be seen that the plane of the top surface of the movable bottom is the horizontal plane, or is near the horizontal plane which contains the axis of the ground wheels and of the beater. This brings the load of material to the fingers at the places where they begin to move backward. As they tear off the particles, they immediately commence to throw them upward and backward. When the apron is below the center of the beater, the vertical portion of the beater acting upon the load is approximately equal to its diameter. In the present case, the vertical portion acting upon the load is approximately equal to the radius of the beater. Where, as is now often times the case, the end gate or rake is dispensed with, it is necessary that the beater parts should extend upward from the bottom of the load-carrying body a sufficient distance to not only hold the upper part of the load within the vehicle when loading, but also to operate upon the upper stratum in order that they may be properly distributed. The disadvantage of using a small beater with its axis below the plane of the movable bottom or apron is that it fails to perform the function of an end gate, and also tends, when in operation, to undermine the entire load and carry backward large chunks of material from the upper surface of the load in an unpulverized condition.

I have mounted the toothed cylinder directly above the beater in such a position that its periphery is but a slight distance above the periphery of the beater. The action of the beater, in raising large portions of material on the ends of its teeth, is opposed by the lower half of the toothed cylinder which, rotating toward the front of the vehicle, constantly pushes back that portion of the load below its center and retards the upper stratum of the material which otherwise would be carried over in a mass upon the beater. The upper part of the toothed cylinder acts upon the uppermost layers of material in a manner similar to the beater, and throws the pulverized particles upward and back toward the ground. The beater and toothed cylinder structures completely fill the end of the vehicle body and serve the purpose of an end gate.

In a low-down machine of this class, where the beater is mounted upon the axle and is consequently near the ground, a lateral spreading device is used to great advantage in conjunction with the pulverizing device. The material having a comparatively short distance to fall in such a machine, is much less liable to be scattered than is the case where the beater is on an axis higher up from the ground. I have, for the purpose of increasing the efficiency of the machine, placed the rotating lateral distributer directly upon the rear ends of the sills in a position where the material thrown from the beater and toothed cylinder will impinge directly upon it and be thrown outward in a swath wider than the machine.

What I claim is:

1. In a fertilizer distributer, the combination of the rear ground wheels, the rotating beater surrounding the axis of the ground wheels and supported directly thereon, the backward moving bottom for supporting the load arranged to feed it to the cylinder on lines above its axle, the body structure having side walls extending to lines above the axis of a toothed cylinder, and adapted to check the backward motion of the upper part of the load, and particles therefrom, and [illegible]

2. [illegible] plane adjacent to the horizontal plane of the beater axis, a toothed cylinder above parallel and adjacent to the beater, and a body structure having its side walls arranged to extend above the beater and to guide the upper part of the load toward the upper cylinder.

3. In a fertilizer distributer, the combination of the body structure, the rear ground wheels, the beater surrounding the axis of the ground wheels and supported directly thereon independently of the body, the backward moving bottom for supporting the load and arranged to feed it to the cylinder at lines above the axis thereof, the train of gear wheels interposed directly between the ground wheels and the beater and the toothed cylinder immediately above the beater and lying in the path of the upper part of the load, substantially as set forth.

4. In a fertilizer distributer, the combination of a body structure, the rear ground wheels, the beater surrounding the axis of the ground wheels, the movable bottom for advancing the load rearward toward the beater and arranged to deliver the lower part of the load to the beater at lines above its horizontal diameter, a toothed cylinder above the beater, and means driven by the beater for rotating the toothed cylinder in the same direction with the beater.

5. In a fertilizer distributer, the combination of the body structure, the rear ground wheels, the rotating beater supported by the ground wheels, the movable bottom having its carrying surface above the axis of the beater, the said bottom serving to carry the load backward and deliver it to the upper part of the beater, the gearing for transmitting power from the ground wheels to the beater, the toothed cylinder directly above the beater and having parts thereof extending below the top of the body structure and into close proximity to the beater thereby serving as a closing means for the rear end of the body, and means for driving the said toothed cylinder in the same direction as the beater, whereby it shreds the particles from the upper part of the load and carries them upward and backward and delivers them to the ground.

6. In a fertilizer distributer, the combination of a body structure, the rear ground wheels, the beater surrounding the axis of the ground wheels, the movable bottom for supporting the load and delivering it to the beater at lines above its axis, the toothed cylinder parallel to and mounted above the beater, and the rotary distributing device behind the main beater adapted to throw the material laterally.

7. In a fertilizer distributer, the combination of the body structure, the main body carrying integral horizontal sills separate from the body and projecting rearward beyond it, the rear ground wheels upon which the said sills are supported at points in advance of their rear ends, the beater mounted upon the ground wheels, the movable bottom having its carrying surface located in a plane above the axis of the beater, and a laterally acting distributing device located at the rear of the beater and mounted upon the rear ends of the said sills.

8. In a fertilizer distributer, the combination of a body structure, the rear ground wheels, the rotating beater surrounding the axis of the ground wheels, the movable bottom for advancing the load toward the beater, the toothed cylinder mounted above the beater, the lateral spreading device, gearing between the beater and the ground wheels, and means connected with the beater for driving the toothed cylinder and lateral distributing device.

In testimony whereof I affix my signature, in presence of two witnesses.

FLOYD R. TODD.

Witnesses:
 THEOPHILUS BROWN,
 H. B. M. KAHIN.